United States Patent [19]

Dalman

[11] Patent Number: 4,678,342

[45] Date of Patent: Jul. 7, 1987

[54] DRUM FOR MIXING AND DISPENSING FEED MATERIAL

[76] Inventor: Austin L. Dalman, Box 261, Baldur, Manitoba, Canada, R0K 0B0

[21] Appl. No.: 769,426

[22] Filed: Aug. 26, 1985

[51] Int. Cl.$^4$ .......................... B01F 9/04; B01F 15/02
[52] U.S. Cl. ..................................... 366/186; 222/171; 222/252; 366/188; 366/193; 366/220; 366/603
[58] Field of Search ............... 366/186, 187, 188, 193, 366/195, 196, 220, 49, 50, 54, 60, 61, 38, 184, 603; 222/171, 169, 120, 252, 413

[56] References Cited

U.S. PATENT DOCUMENTS

| | | | |
|---|---|---|---|
| 3,088,711 | 5/1963 | Phillips | 366/187 |
| 3,147,956 | 9/1964 | Phillips | 366/187 |
| 4,100,617 | 7/1978 | Hoopman | 366/186 |

Primary Examiner—Robert W. Jenkins

Attorney, Agent, or Firm—Adrian D. Battison; Stanley G. Ade

[57] ABSTRACT

Apparatus for mixing and dispensing feed material particularly for cattle comprises a cylindrical drum which has an inlet in the form of a longitudinal slot along part of the length of the drum which is closable by doors pivoted on the drum. An outlet is formed by a plurality of openings arranged around the drum at a portion thereof spaced from the inlet opening. A sleeve around the drum can be moved to open and close the outlet openings. A belt wrapped around the drum catches material discharged from the drum and feeds is out to one side of the drum. The drum can be mounted upon a vehicle for transportation along a line of receptacles so that rotation of the drum discharges material into the receptacles. The drum is free from inner moving parts or bearings which contact the feed material.

18 Claims, 7 Drawing Figures

4,678,342

DRUM FOR MIXING AND DISPENSING FEED MATERIAL

BACKGROUND OF THE INVENTION

This invention relates to an apparatus for mixing and dispensing material such as feed for animals.

With the advent of more intensive farming of animals and particularly cattle, there has been a need for a machine or apparatus which will mix a feed lot for the animals and then deposit the materials in the receptacles from which the animals can eat. Various arrangements have been proposed and used for this function and generally they include a drum with a plurality of auger flightings mounted within the drum and rotatable to mix up the feed and then to transport it from the drum for deposit into the feed receptacles. Such arrangements are disadvantageous for a number of reasons. Firstly, the mixing augers are mounted on bearings and with drive arrangements which are exposed to the feed material and thus to the juices which can be extracted from the material and are highly corrosive. Secondly, the rotation of the augers requires considerable power which of course increases the cost of the operation. Thirdly, the mixing augers tend to compress and scrape the feed into a less palatable mass thus reducing the cattles' desire to eat and thus the required rapid weight gain.

SUMMARY OF THE INVENTION

It is one object of the present invention therefore to provide an improved apparatus for mixing and dispensing material such as feed which overcomes one or more of the above disadvantages.

According to a first aspect of the invention, therefore, there is provided an apparatus for mixing and dispensing material comprising a cylindrical drum having end walls and a cylindrical peripheral wall for receiving and containing the material, means mounting the drum for rotation about a substantially horizontal axis arranged at longitudinally of the drum, an inlet opening in the drum through which said material can be introduced into the drum, means for preventing escape of said material from said drum through said inlet opening during said rotation thereof for mixing said material, outlet opening means in said peripheral wall extending angularly around the wall at an axially aligned position whereby rotation of said drum causes said material to be deposited from said drum by gravity at said axially aligned position, means for closing said outlet opening means and conveyer means for collecting said deposited material and conveying it from the drum for dispensing.

According to a second aspect of the invention there is provided an apparatus for mixing and dispensing material comprising a cylindrical drum having end walls and a cylindrical peripheral wall for receiving and containing the material, means mounting the drum for rotation about a substantially horizontal axis arranged longitudinally of the drum, an inlet opening in the peripheral wall of the drum arranged longitudinally of the axis through which said material can be introduced into the drum, means for closing said inlet opening means to prevent escape of said material from said inlet opening during said rotation of the drum for mixing of said material, outlet opening means in said peripheral wall extending angularly around the wall at an axially aligned position whereby rotation of said drum causes said material to be deposited from said drum by gravity at said axially aligned position, means for closing said outlet opening means and conveyer means for collecting said deposited material and conveying it from the drum for dispensing.

According to a third aspect of the invention there is provided an apparatus for mixing and dispensing material comprising a cylindrical drum for receiving the material, a vehicle including ground wheels for moving along a series of receptacles for the material, means mounting the drum on the vehicle for movement therewith and for rotation of the drum about a substantially horizontal axis longitudinal of the drum, inlet means through which said material can be introduced into the drum for mixing by said rotation and arranged such that it can prevent escape of said material from said inlet means during said rotation, outlet opening means in the drum arranged such that rotation of said drum causes ejection of said material through said outlet opening means, means for closing said outlet opening means, and means for guiding said ejected material from said outlet opening means to a position at one said of said vehicle for deposit into said receptacles.

Most preferably therefore the drum of the present invention is free from inner moving parts which are exposed to the feed material and hence basically all bearings and drives are outside the drum and kept well clear of the feed material and corrosive juices.

The movement of the material from the drum to the outlet can be obtained by providing the outlet as a series of openings around the periphery of the drum at one axially aligned position so that as the openings pass a bottom position of the drum the material falls from the drum onto the conveyor. Thus, the movement of the material is obtained effectively wholly by gravity.

The inlet opening can be provided as a longitudinal opening in the peripheral wall of the drum with a pair of doors pivoted on the drum so as to be able to close the opening and also to open to a position in the form of a chute.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 7 is a partial side elevational view similar to FIG. 1 and showing the discharge system of FIG. 3.

In the drawings like characters of reference indicate corresponding parts in the different figures.

DETAILED DESCRIPTION

Figure 1:
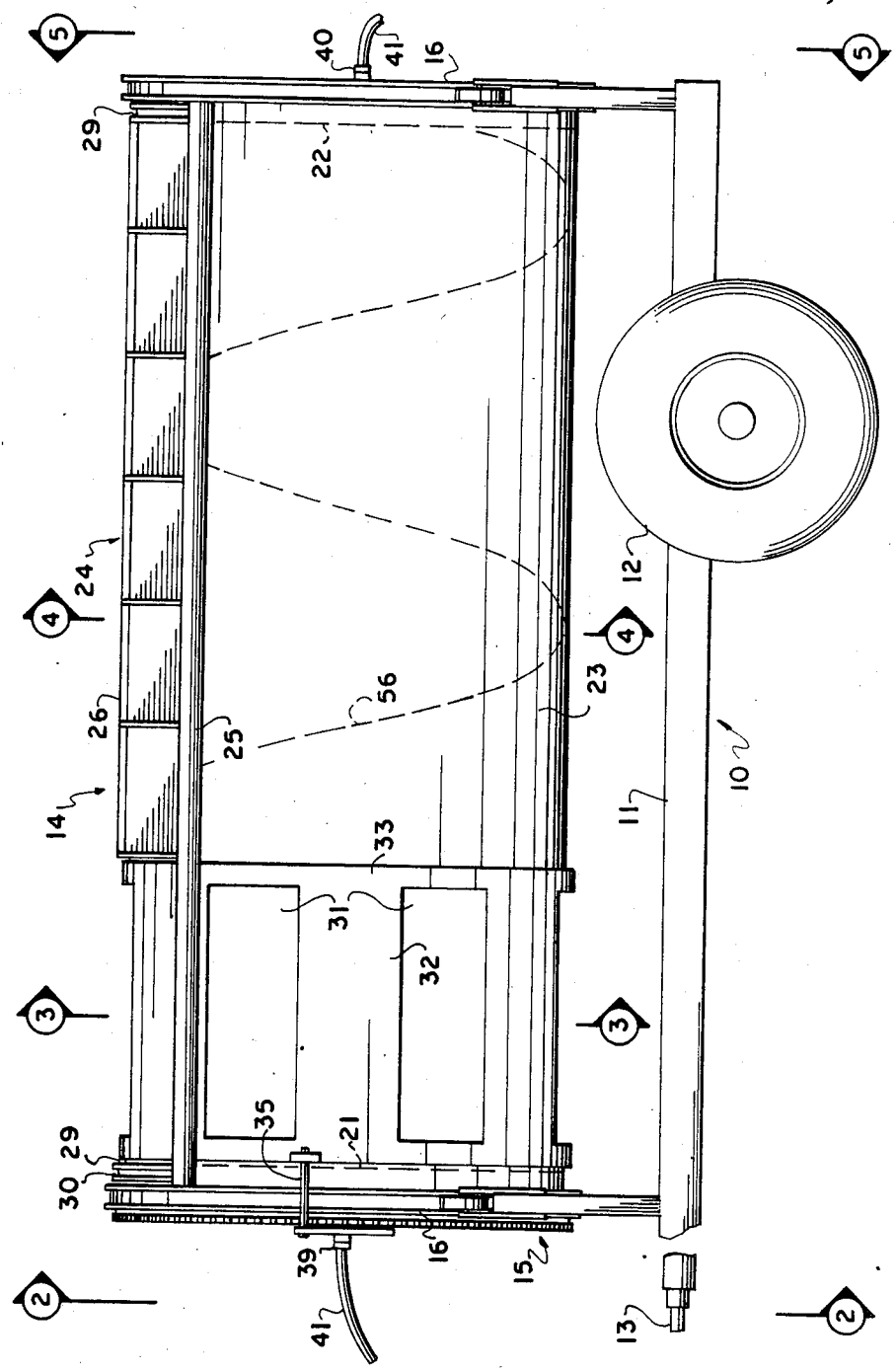
FIG. 1 is a side elevational view of an apparatus according to the invention with the discharge system omitted for simplicity of illustration.

The apparatus comprises a vehicle 10 in the form of a frame 11 mounted on ground wheels 12 for transport forwardly under power from a tractor not shown which is coupled to a hitch 13.

Mounted upon the frame 11 is a drum 14 for receiving and mixing the feed. The drum is mounted upon four bearing members 15 one at each corner of the frame and each comprising a vertical strut 151 which supports a pair of rollers 152 on an arcuate support plate 153. The rollers 152 are thus arranged at the respective ends of the drum one on either side of the frame for supporting the drum in rotational movement about the axis of the cylinder defining the shape of the drum. Tracks 16 are defined on the outer surface of the drum at the ends for receiving the rollers 15 so as to act as thrust bearings to retain the drum in position on top of the frame.

The drum can be rotated about its axis by a drive chain 17 cooperating with a gear 18 formed on the front end of the drum. The chain 17 is driven via idler gears 19 by a drive chain wheel 20 which can be driven by a hydraulic motor or from a PTO shaft of the tractor depending upon requirements.

The drum is effectively a closed cylinder with end walls 21, 22 and a cylindrical peripheral wall 23. The peripheral wall 23 is broken or perforated to provide firstly an inlet opening 24 which extends approximately over ninety degrees of arc along approximately three-quarters of the length of the drum in a direction longitudinal of the axis of the drum. Along either side of the opening is a tube 25 which extends outwardly to the ends of the drum and each tube 25 carries a respective door 26 which is flat and which cooperates with the opposite door to close the opening 24. The tubes can be rotated through an angle sufficient to open and close the doors by hydraulic cylinders 27, one mounted at each end of the drum. The cylinders operate upon a pair of cranks 28 which pass through slots 29 in a flange overhanging the ends of the drum on which the track 16 is mounted. The cranks 28 at one end operate directly upon the doors 26 and at the other end upon a pair of levers 30 connected to the tubes 25 and thence to the doors 26.

The remaining quarter of the drum spaced from the opening 24 includes a plurality of outlets openings 31 spaced around the periphery of the drum and separated by a wall portion 32. There are six such openings spaced equi-distantly around the whole periphery of the drum. A sleeve 33 surrounds the drum at the openings 31 and includes a plurality of openings 34 of the same size and shape as the openings 31 so that they can align therewith to allow material to escape from the drum. At the same time the sleeve can be rotated so that the openings are aligned with the wall portions 32 to prevent any escape of material. The movement of the sleeve 33 is obtained by pins 35, 37 driven by a lever 36 mounted on one end of the drum. A central pivot point of the lever 36 is coupled to the end face of the drum on the axis and the lever can be actuated by a cylinder 38 to rotate the sleeve around the drum to the open and closed positions. The cylinder 38 is mounted on the end face of the drum and rotates therewith.

Hydraulic fluid is supplied to the cylinders 27 and 38 via slip couplings 39 and 40 mounted on the axis of the drum at opposed ends thereof. Suitable hydraulic supply which is valved so that it can be reversed in direction is provided in a conventional manner (not shown) with only the conduits leading to the slip coupling being shown schematically in FIG. 1 at 41. Fluid from the slip coupling 39 passes to a T-valve 42 which can supply either a conduit 43 leading to the cylinder 38 or a conduit 44 leading to the cylinders 27. A subsidiary portion of the conduit 44 indicated at 441 leads through one of the tubes 25 to the rear end of the drum for communication to the cylinder 27 at that end. Return fluid from the cylinder 38 passes along a conduit 45 through the other tube 25 to the remote end for coupling to the slip coupling 40. Return couplings from the cylinders 27 communicate fluid to the slip coupling 40 via portions 46 and 461. Thus, it will be appreciated that the valve 42 can be actuated to one or other of the channels so as to operate either the cylinder 38 or the cylinders 27 depending upon whether loading or discharge of the material is required at that point. The remote switch of conventional form in the hydraulic fluid supply allows retraction of the cylinders 38, 27 depending upon the actuation position of the valve 42.

Figure 3:
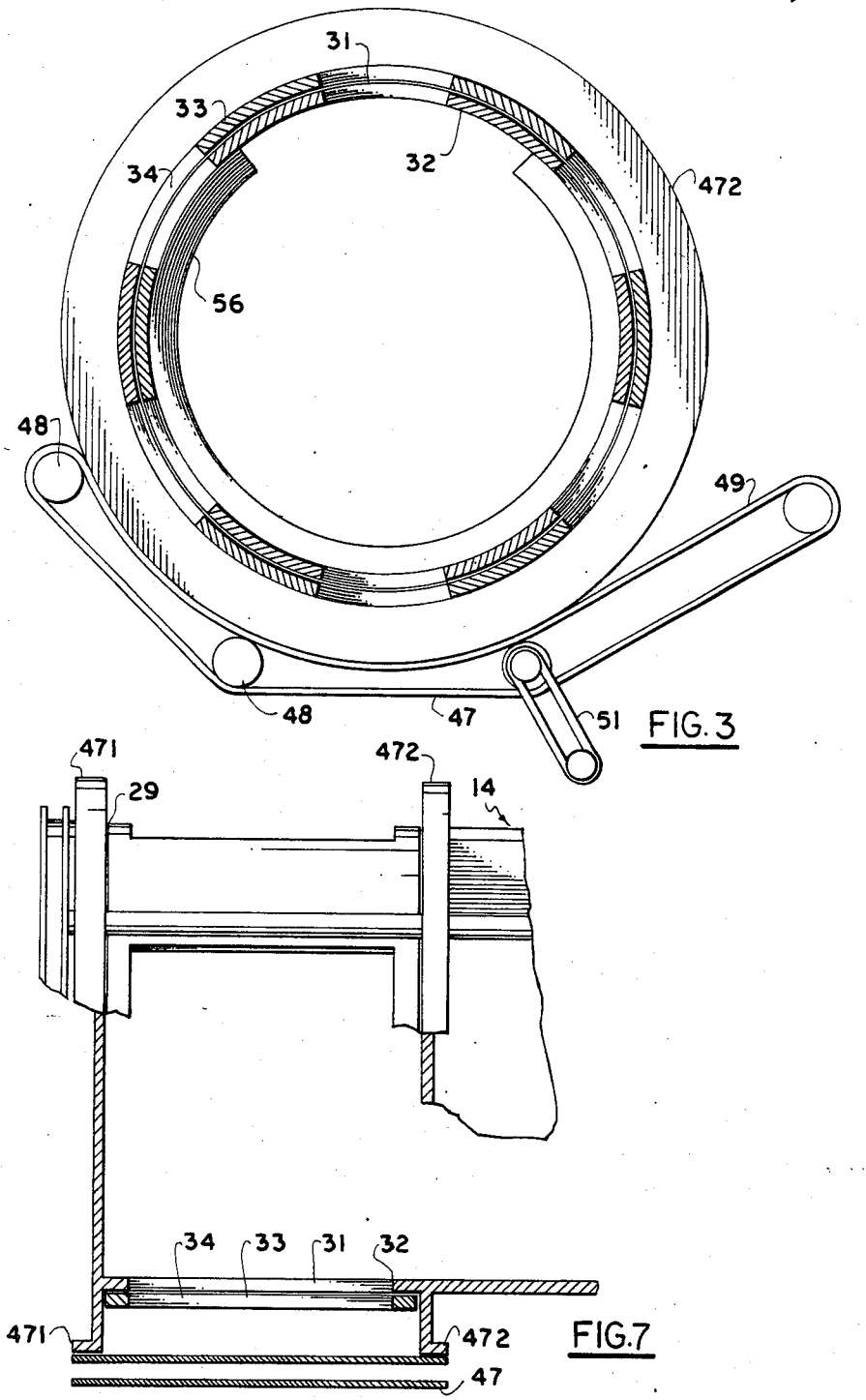
FIG. 3 is a cross sectional view taken along the lines 3—3 in FIG. 1 showing the discharge system.
Figure 4:
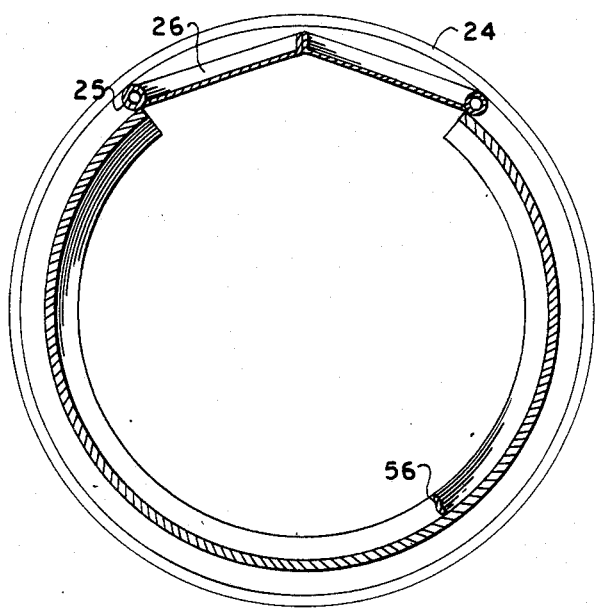
FIG. 4 is a cross sectional view taken along the lines 4—4 in FIG. 1.
Figure 5:
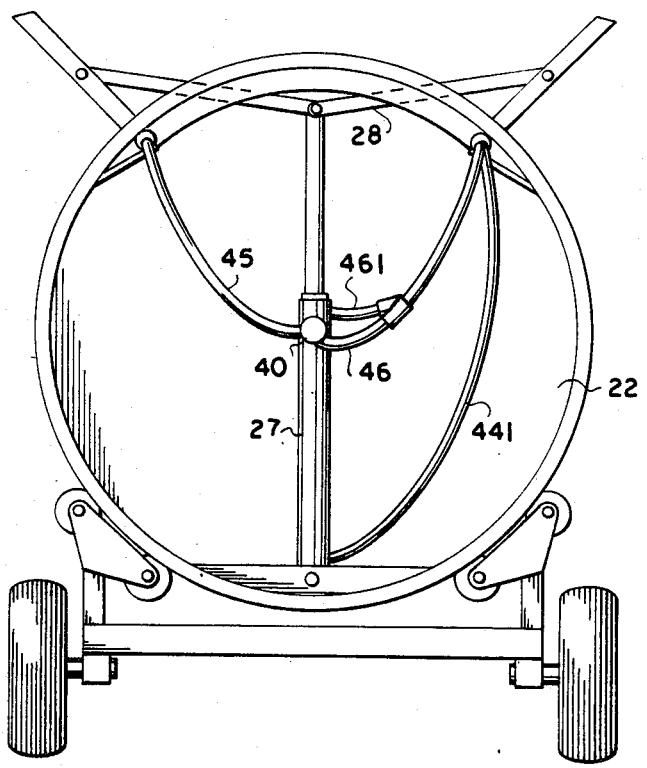
FIG. 5 is an end elevational view taken along the lines 5—5 of FIG. 1.

A conveyer shown in FIGS. 3 and 7 is arranged around and beneath the drum for cooperation with the outlet openings 31. The conveyer as shown in FIG. 3 is in the form of a belt 47 mounted on rollers 48 and arranged such that an outer run of the belt rubs against a pair of rings 471, 472 coaxial to the drum and spaced axially of the drum on respective sides of the openings 31. The rings 471, 472 are mounted on flanges 473, 474 radial to the drum so as to support the belt away from the surface of the drum. As shown, the belt on one side of the drum passes upwardly to a position approximately half way up the drum in contact with the rings 471, 472 so as to prevent the material escaping from the drum at that point. The belt then leaves the surface of the rings at a position adjacent or just forwardly of the bottom of the drum so as to carry material discharged from the drum over an upwardly inclined portion of the belt indicated at 49 to a discharge duct 50. The belt is driven in any suitable manner for example a pulley and drive belt 51 and is arranged to have a surface speed slightly greater than the rotational speed of the drum so that it slides over the rings at a slightly faster rate to withdraw the material away from the drum up the inclined portion 49. The surfaces of the belt and the outer surface of the rings are coated with the teflon material so that the belt can run against the rings 33 without interfering with the rotation of the drum or without causing undue wear.

Figure 6:
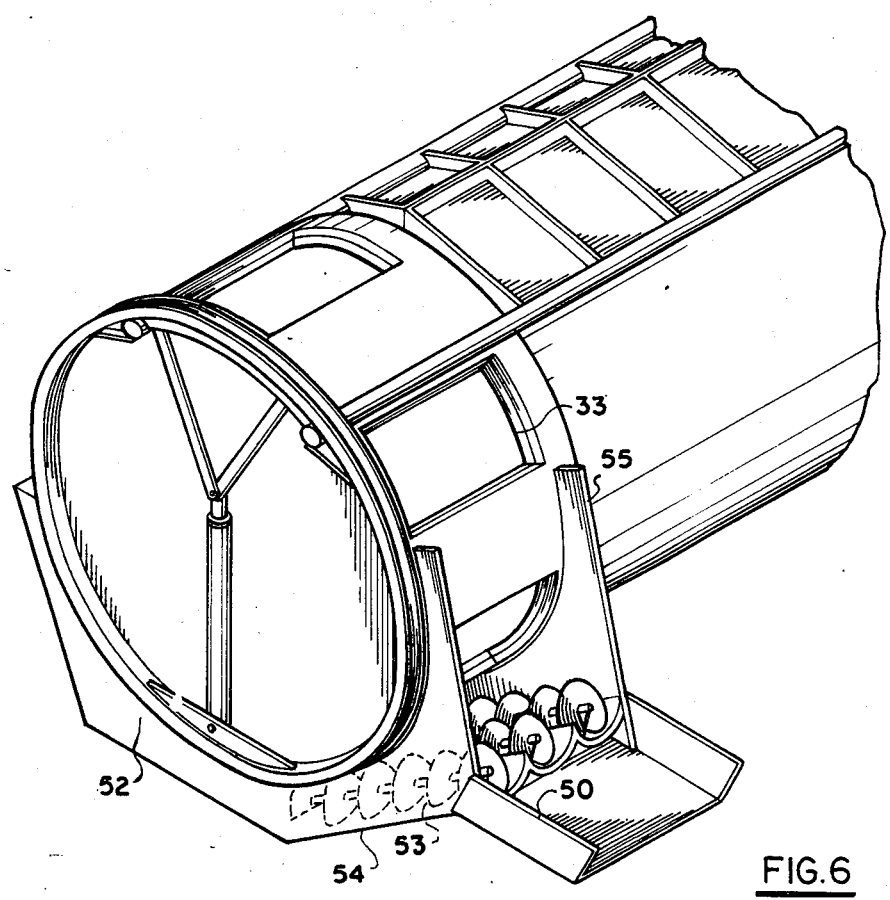
FIG. 6 is a cross sectional view similar to FIG. 3 showing an alternative arrangement of conveyer apparatus for discharging feed material deposited from the drum.

An alternative conveying system is illustrated in FIG. 6 and comprises a fixed chute 52 which confines the material so that any escaping from the drum falls to the bottom of the drum for collection by a conveyer member in the form of three flightings 53 rotatable in channels 54. The flightings 53 ascend from the bottom of the drum to a position at one side of the drum to the discharge chute 50. Side guards 55 on the discharge side of the drum again confine the material so that any material discharging falls onto the flightings 53 for discharge from the chute 50.

A spiral is formed on the inside of the drum by a flat iron 56 welded onto the inside surface of the drum which acts to work the material in the drum toward the outlet openings so that all the material within the drum is discharged to completely empty the drum at the end of a batch.

Figure 2:
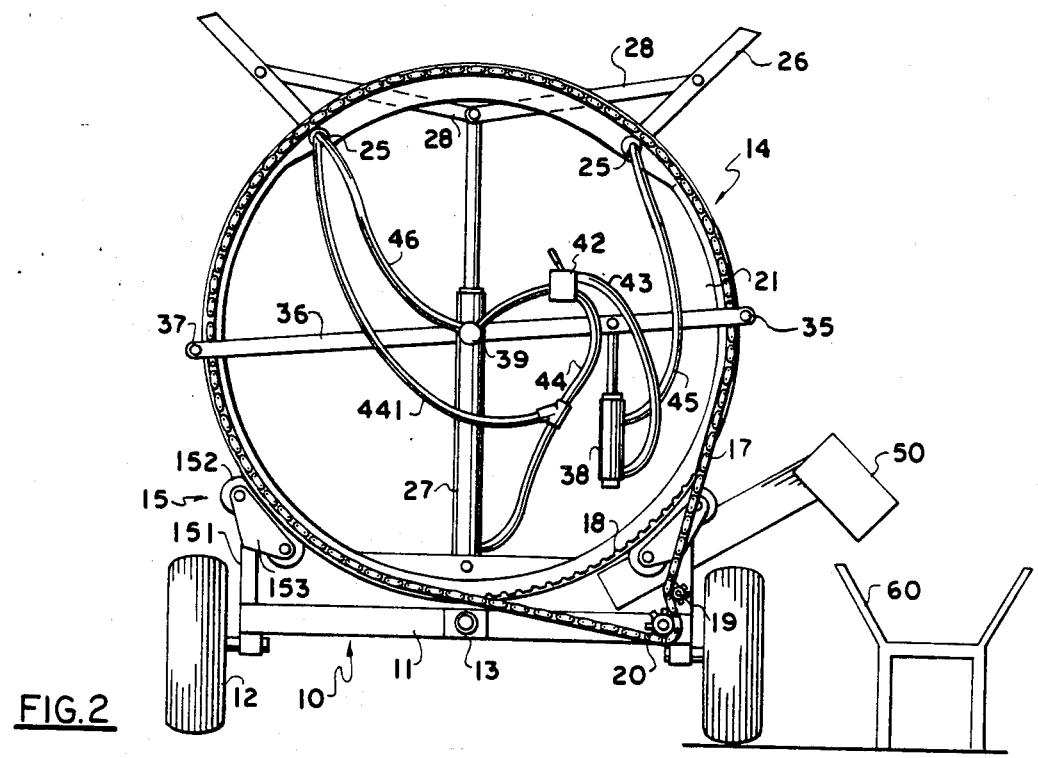
FIG. 2 is an end elevational view taken along the lines 2—2 in FIG. 1.

In operation a batch of feed material including various different portions of that material are fed into the drum firstly by opening the doors 26 as previously explained into the positioin shown in FIG. 2. In the position of the doors they act as a chute so as to guide the material into the longitudinal inlet opening 24. The doors are then closed and the drum rotated with the sleeve 33 again in a closed position so the mixing of the feed can occur. At the same time the feed is fluffed up rather than compressed but an effective mixing takes place. After a period of time depending upon the materials involved, the drum is stopped and the valve 42 actuated to the opposite position so that the supply of hydraulic fluid actuates the cylinder 38 to open the sleeve 33. The drum is then restarted in its rotation with the rotation causing the material to drop from the drum onto the belt or onto the screw conveyer for discharge from the chute 50. At the same time the vehicle can be towed along a plurality of receptacles 60 so that a continuous and constant speed rotation of the drum continuously and constantly feeds material from the chute 50 into the receptacle 60 at a required rate.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for mixing and dispensing material comprising a cylindrical drum having end walls and a cylindrical peripheral wall for receiving and containing the material, means mounting the drum for rotation about a substantially horizontal axis arranged longitudinally of the drum, an inlet opening in the drum through which said material can be introduced into the drum, means for preventing escape of said material from said drum through said inlet opening during said rotation thereof for mixing said material, a plurality of separate outlet opening means in said peripheral wall at an axially aligned position, each extending angularly around the wall and each in angularly spaced relation to an adjacent opening whereby rotation of said drum causes said material to be deposited from said drum by gravity at said axially aligned position, cover means mounted on said drum for corotatioin therwith and movable relative thereto from a first position for closing said outlet opening means to a second position in which all of said opening means are opened and conveyer means for collecting said deposited material and conveying it from the drum for dispensing.

2. Apparatus according to claim 1 wherein the drum is free from interior moving parts whereby said material is deposited from said drum through said outlet opening means solely by said rotation of said drum.

3. Apparatus according to claim 1 wherein the drum is mounted on external bearing means whereby said bearing means are maintained spaced from said material.

4. Apparatus according to claim 1 wherein the drum is mounted on a vehicle for moving along a series of receptacles for the material with the axis of the drum longitudinal of the vehicle and wherein said conveyer means is arranged to convey the material to one side of the vehicle for deposit into said receptacles.

5. Apparatus according to claim 1 wherein said outlet opening means comprises a plurality of separate spaced openings arranged around the peripheral wall at said axially aligned position whereby rotation of said drum causes substantially constant deposit of said material from said drum onto said conveyer means.

6. Apparatus according to claim 5 wherein said conveyer means includes means for preventing escape of said material to the sides of the drum.

7. Apparatus according to claim 6 wherein said conveyer means includes a stationary guard at least partly surrounding the drum at said axially aligned position for confining said escape of said material to a position adjacent the bottom of the drum.

8. Apparatus according to claim 1 wherein the conveyer means includes a plurality of auger means having a flight arranged to rotate within a channel and wherein said opening means is arranged to deposit said material onto said flight for conveying of said material by said flight.

9. Apparatus according to claim 1 wherein the inlet opening comprises an opening in the peripheral wall of the drum and arranged longitudinally of the axis.

10. Apparatus according to claim 9 wherein said means for closing said inlet opening comprises a pair of doors mounted on the drum for rotation therewith and pivotal relative thereto about respective axes parallel to the axis of the drum from a closed position closing said opening means to an opened position in which the doors incline outwardly to define a chute into the drum.

11. Apparatus according to claim 1 wherein said means for closing said outlet opening means comprises a sleeve slideable on the peripheral wall of the drum.

12. Apparatus according to claim 11 wherein the outlet opening means surrounds the drum at said axially aligned position and wherein said sleeve is arranged to be rotatable around the drum and includes a plurality of openings which can be aligned with said opening means.

13. Apparatus for mixing and dispensing material comprising a cylindrical drum having end walls and a cylindrical peripheral wall for receiving and containing the material, means mounting the drum for rotation about a substantially horizontal axis arranged longitudinally of the drum, an inlet opening in the drum through which said material can be introduced into the drum, means for preventing escape of said material from said drum through said inlet opening during said rotation thereof for mixing said material, a plurality of separate outlet opening means in said peripheral wall at an axially aligned position, each extending angularly around the wall and each in angularly spaced relation to an adjacent opening whereby rotation of said drum causes said material to be deposited from said drum by gravity at said axially aligned position, cover means mounted on said drum for corotation therewith and movable relative thereto from a first position for closing said outlet opening means to a second position in which all of said opening means are opened and conveyer means for collecting said deposited material and conveying it from the drum for dispensing, wherein the conveyer means comprises a belt at least partly wrapped around the drum and spaced therefrom at the bottom and to one side thereof to allow said material to escape from the drum to deposit on the belt at the bottom and said one side for conveying said material from said drum.

14. Apparatus for mixing and dispensing material comprising a cylindrical drum having end walls and a cylindrical peripheral wall for receiving and containing the material, means mounting the drum for rotation about a substantially horizontal axis arranged longitudinally of the drum, an inlet opening in the drum through which said material can be introduced into the drum, means for preventing escape of said material from said drum through said inlet opening during said rotation thereof for mixing said material, a plurality of separate outlet opening means in said peripheral wall at an axially aligned position, each extending angularly around the wall and each in angularly spaced relation to an adjacent opening whereby rotation of said drum causes said material to be deposited from said drum by gravity at said axially aligned position, cover means mounted on said drum for corotation therewith and movable relative thereto from a first position for closing said outlet opening means to a second position in which all of said opening means are opened and conveyer means for collecting said deposited material and conveying it from the drum for dispensing, wherein said means for closing said outlet opening means and said means for preventing escape through said inlet opening are arranged to be operated by hydraulic cylinders and wherein there is provided means for supplying hydraulic fluid under pressure to said cylinders and withdrawing hydraulic fluid from said cylinders, said cylinders being mounted on the drum and said means being arranged to receive and return hydraulic fluid from said drum through common slip couplings at respective ends of the drum and selectively operable valve means mounted on the drum for actuating alternately one of said hydraulic cylinders.

15. Apparatus according to claim 14 wherein the drum is free from interior moving parts whereby said material is deposited from said drum through said outlet opening means solely by said rotation of said drum.

16. Apparatus according to claim 14 wherein the drum is mounted one external bearing means whereby said bearing means are maintained spaced from said material.

17. Apparatus according to claim 14 wherein said outlet opening means comprises a plurality of separate spaced openings arranged around the peripheral wall at said axially aligned position whereby rotation of said drum causes substantially constant deposit of said material from said drum onto said conveyer means.

18. Apparatus according to claim 17 wherein said conveyer means includes means for preventing escape of said material to the sides of the drum.

* * * * *